June 12, 1923.

W. RIETZ 1,458,594

ROLLER BEARING

Filed July 2, 1919

Inventor
William Rietz
By Rector, Hibben, Davis & Macauley
His Attorneys

Patented June 12, 1923.

1,458,594

UNITED STATES PATENT OFFICE.

WILLIAM RIETZ, OF SHEBOYGAN FALLS, WISCONSIN, ASSIGNOR TO WHITE WAGON WORKS, OF SHEBOYGAN FALLS, WISCONSIN, A CORPORATION OF WISCONSIN.

ROLLER BEARING.

Application filed July 2, 1919. Serial No. 308,206.

*To all whom it may concern:*

Be it known that I, WILLIAM RIETZ, a citizen of the United States, residing at Sheboygan Falls, in the county of Sheboygan and State of Wisconsin, have invented certain new and useful Improvements in Roller Bearings, of which the following is a specification.

My invention relates to roller bearings and may be regarded as an improvement upon the construction shown in Patent No. 1,300,485, dated April 15, 1919. The object of my present improvement is to avoid certain defects incident to the patented construction, and to improve and strengthen the parts through which the bearing members are retained in the hubs, and provides for a more expeditious and desirable assemblage of the parts of the bearing and hub structure. My invention resides in the specific form and arrangement of the co-operating parts by which the above mentioned objects and advantages are attained, the essential elements thereof being more particularly pointed out in the appended claims.

Figure 1:
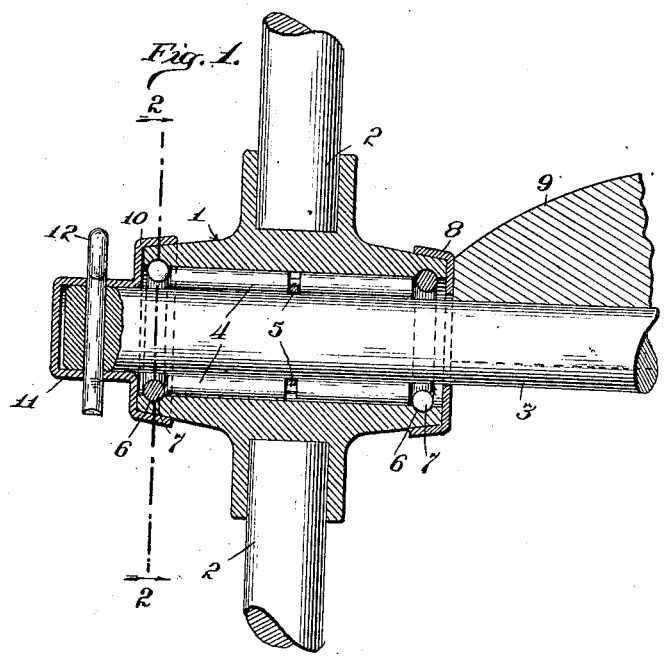
Figure 2:
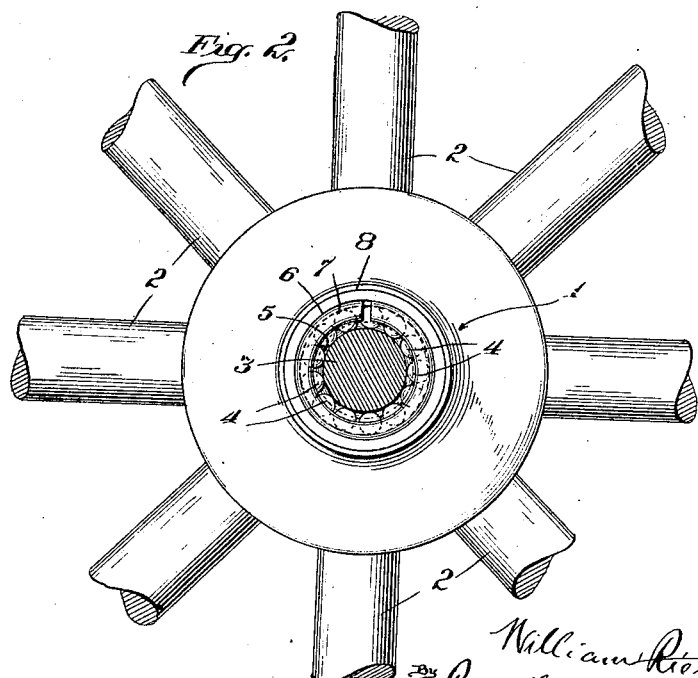

In the accompanying drawing forming part of this specification, Fig. 1 is a central vertical section of the hub and portions of the spokes of a wheel to which my invention is applied; and Fig. 2 is an end or face view of same, with the dust cap removed.

The same reference characters indicate the same parts in both figures of the drawing.

It will be understood that my invention is applicable to roller bearings generally, though it is more particularly designed for the bearings of light vehicles such as children's wagons and the like. The hub 1 of the bearing is in the present instance formed with a medium flange provided with radial sockets for the spokes 2 of the wheel, and is provided with a cylindrical bore of such diameter as to receive the axle 3 together with a set of rollers 4 arranged circumferentially around the axle. As shown, and as in my prior patent, these rollers are formed with registering annular grooves arranged to receive a retaining ring 5. Outside the two opposite planes in which the ends of the rollers or pins lie the bore of the hub is formed with opposite annular grooves 6 arranged to each receive a split spring ring 7 which is sprung into it and serves to retain the rollers in the hub. Inasmuch as the hubs are ordinarily made of cast iron which possesses slight ductility, and is brittle and liable to chip and break when hammered, this construction and arrangement of the retaining members is more secure than a construction in which the end of the hub is upset over a retaining washer; it enables the hub to be cast in a form which is not altered in assembling the hub; is convenient to apply, and is highly efficient in serving the purpose for which it is intended.

As in my prior patented construction, on the inside of the hub is arranged a flanged dust cap 8 which may be held in position, as shown, by a portion 9 of the gear of the vehicle. The hub is held on the axle by a flanged dust cap and retaining member 10 formed with a central tubular extension 11 surrounding the end of the axle and secured thereto by a cotter pin 12.

From the description of my invention which has been given it will be apparent that the novel construction described is simple and convenient to manufacture, is strong and durable, and highly satisfactory and efficient in accomplishing the ends in view.

I claim:

A roller bearing comprising a cast metal hub formed with a uniform cylindrical bore therethrough and internal annular grooves adjacent the opposite ends of the hub, resilient split rings of rounded cross-section engaging said grooves, an axle, and rollers arranged around said axle within the bore of the hub and between said rings, said rings co-operating directly with the ends of said rollers to hold such rollers in place.

WILLIAM RIETZ.